United States Patent Office 3,156,699
Patented Nov. 10, 1964

3,156,699
N-(5-NITRO-THIAZOLYL-2)2,4-DINITRO-
PYRROLE-1-ACETAMIDE
George Karmas, Bound Brook, N.J., assignor to Ortho
 Pharmaceutical Corporation, a corporation of New
 Jersey
No Drawing. Original application Apr. 20, 1960, Ser.
 No. 23,383. Divided and this application July 18,
 1961, Ser. No. 124,767
1 Claim. (Cl. 260—306.8)

The present invention relates to 1-substituted 2,4-dinitropyrroles. Specifically, the new compounds may be represented by the following structural formula

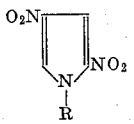

in which R is a substituent selected from the group consisting of carbamylmethyl, acetenyl, acetonyl, acetylalkyl, alkenyl, alkyl, aminoalkyl, phenylalkyl, carbalkoxymethyl, carboxymethyl, haloalkyl and hydroxy alkyl radicals.

As examples of 2,4-dinitropyrroles coming within the scope of the above formula may be mentioned the following: 1-(N,N-diethyl)carbamylmethyl-2,4-dinitropyrrole, 1-propargyl-2,4-dinitropyrrole, 1-acetonyl-2,4-dinitropyrrole, 1-(γ-acetoxypropyl) - 2,4 - dinitropyrrole, 1-allyl-2,4-dinitropyrrole, 1-isoamyl-2,4-dinitropyrrole, 1-(γ-diethylaminopropyl)-2,4-dinitropyrrole, 1 - benzyl-2,4-dinitropyrrole, 1-(γ-acetoxypropyl)-2,4-dinitropyrrole, 1-alcarboxymethyl-2,4-dinitropyrrole, 1-(β-iodoethyl)-2,4-dinitropyrrole and 1-(δ-hydroxybutyl)-2,4-dinitropyrrole.

The compounds of the present invention have antimicrobial activity and more specifically are effective against *Trichomonas foetus*, a parasitic protozoan that infects the uterus of animals and causes abortion in cattle. The high order of trichomonadicidal activity possessed by the compounds of the present invention is quite surprising as the closely related 1-alkyl-2,5-dinitropyrroles have no useful activity.

It is an object of the present invention to provide new compounds having therapeutic utility in the treatment of animals infected with *Trichomonas foetus*.

It is also an object of this invention to provide a new method for the preparation of 1-substituted 2,4-dinitropyrroles.

Heretofore it has been proposed to prepare N-alkylpyrroles by reacting pyrrole with potassium metal in an organic solvent such as a low boiling hydrocarbon and reacting the resulting N-potassiumpyrrole with an alkyl halide, for example, methyl iodide. The latter reaction is carried out either by heating the ingredients together in a sealed tube at 120–130° C., or by refluxing in a low boiling organic solvent. By this method, N-methylpyrrole can be obtained in yields around 25–50%. A considerable amount of pyrrole is converted to α-methylpyrrole, which side reaction is primarily responsible for the relatively low yield of the desired N-alkyl product.

It has also been proposed to react an alkali metal pyrrole in anhydrous liquid ammonia with an organic halide. Under such conditions, high yields have been obtained, but the anhydrous liquid ammonia solvent is more difficult to handle than a solvent having a lower vapor pressure. Moreover, the alkylation reaction, at liquid ammonia temperature, requires several hours for completion.

In accordance with the present invention, the alkylation of 2,4-dinitropyrroles is effected in dimethylformamide which is a superior solvent for this reaction. In general, the alkali metal salt of 2,4-dinitropyrrole and an excess of the alkylating agent, which may be a chloride, bromide, iodide, sulfate, sulfonate, etc., are heated in dimethylformamide for varying periods of time (determined by the reactivity of the alkylating agent). The reaction product is isolated and purified by conventional procedures of extraction, distillation, recrystallization, etc. In those instances where the grouping introduced at the 1-position of the pyrrole contains a functional group, further reactions may be performed on this group. For example, an ester may be hydrolyzed to a carboxylic acid and the latter may further be converted to an acid chloride, from which a wide variety of derivatives may be prepared.

The following examples will serve to illustrate more fully the method of preparing the novel compounds of the present invention.

EXAMPLE I

*1-Butyl-2,4-Dinitropyrrole*

A mixture of 5 grams (0.0275 mole) of the sodium salt of 2,4-dinitropyrrole, 8-milliliters of dibutyl sulfate, and 20 milliliters of dimethylformamide is heated to a gentle boil and after one minute is cooled and poured with stirring into a mixture of 200 milliliters of water, 100 grams ice, and 15 grams of sodium carbonate layered with 150 milliliters of ether. This mixture is shaken vigorously and then the layers are separated. The ether solution is washed with 100 milliliters of 5% aqueous sodium carbonate, dried with anhydrous magnesium sulfate, concentrated, and then distilled. The 1-butyl-2,4-dinitropyrrole is a pale yellow oil which distills at 130–135° C. at 0.2 mm.

Unalkylated 2,4-dinitropyrrole may be recovered from the aqueous sodium carbonate solutions by acidification and extraction with ether.

Dimethyl sulfate, diethyl sulfate, and dipropyl sulfate have also been reacted with the sodium salt of 2,4-dinitropyrrole following this procedure.

EXAMPLE II

*1-Isoamyl-2,4-Dinitropyrrole*

A mixture of 5 grams (0.0275 mole) of the sodium salt of 2,4-dinitropyrrole, 6 milliliters of isoamyl bromide, and 10 milliliters of dimethylformamide is heated under reflux for two hours. The reaction mixture is worked up as described for the 1-butyl analog (Example I), and distillation affords 1-isoamyl-2,4-dinitropyrrole as a pale yellow oil which distills at 135–140° C. at 0.1 mm.

EXAMPLE III

*1-Propyl-2,4-Dinitropyrrole*

A mixture of 38.6 grams (0.215 mole) of the sodium salt of 2,4-dinitropyrrole, 30 milliliters of propyl bromide, and 30 milliliters of dimethylformamide is heated in a sealed tube at 135–140° C. for 3½ hours. After cooling, the tube is opened and the reaction mixture is worked up as described in Example I above. Distillation affords 24.7 grams of 1-propyl-2,4-dinitropyrrole. This solid product is recrystallized from an ether-ligroin mixture to give 20.2 grams (47.2% yield) of pale yellow prisms, melting point 56–57° C.

From the aqueous sodium carbonate solutions, a 35% recovery of 2,4-dinitropyrrole is effected by acidification with hydrochloric acid and extraction with ether.

EXAMPLE IV

*1-(2,3-Dihydroxypropyl)-2,4-Dinitropyrrole*

A mixture of 5 grams (0.0275 mole) of the sodium salt of 2,4-dinitropyrrole, 6 milliliters of α-glyceryl monochlorohydrin, and 20 milliliters of dimethylformamide is heated under reflux for fifty minutes, cooled slightly, and then concentrated under vacuum to remove the solvent. The viscous concentration residue is leached with three 300-milliliter portions of boiling ether, decanting each time from the insoluble residue. The combined ether solution is concentrated and the oily residue is distilled to afford the crude product as a viscous oil which boils at 200–210° C., at 0.01–0.02 mm. It solidifies on standing and is recrystallized from ethyl acetate to give 2.4 grams (37.8% yield) of 1 - (2,3 - dihydroxypropyl)-2,4-dinitropyrrole, small cream prisms of melting point 111–112° C.

This procedure is generally suitable for the preparation of water soluble 1-substituted-2,4-dinitropyrroles because it avoids the loss of these in aqueous wash solutions. It has been applied to the synthesis of the corresponding 1-($\beta$-hydroxyethyl) and 1-($\gamma$-hydroxypropyl) analogs.

EXAMPLE V

1-($\delta$-Hydroxybutyl)-2,4-Dinitropyrrole

To a solution of 8.6 grams (0.0317 mole) of 1-($\delta$-acetoxybutyl)-2,4-dinitropyrrole (prepared according to the process of Example II from $\delta$-chlorobutyl acetate) in 140 milliliters of methanol is added a solution of 1.27 grams (0.0317 mole) of sodium hydroxide in 15 milliliters of water. This mixture is warmed at 50° C. for five minutes and is then concentrated under vacuum after the addition of 50 milliliters of water. After all the methanol has been removed, the residual mixture of oil product and water is extracted with two 150 milliliter portions of ether. The combined ether solution is dried and distilled to afford 1-($\delta$-hydroxybutyl)-2,4-dinitropyrrole as a viscous, pale yellow oil of boiling point 170–180° C. at 0.002 mm., with $n_D^{24}$ 1.5934. The yield is 5.9 grams (81.2%).

Calcd. for $C_8H_{11}O_5N_3$: N, 18.34. Found: N, 18.46.

EXAMPLE VI

1-($\beta$-Acetoxyethyl)-2,4-Dinitropyrrole

A mixture of 5 grams (0.0275 mole) of the sodium salt of 2,4-dinitropyrrole, 7 milliliters of ethylene chlorohydrin, and 20 milliliters of dimethylformamide is heated under reflux for twelve minutes and is then concentrated under vacuum at 90° C. To the residue is added 20 milliliters of acetic anhydride and this mixture is heated under reflux for one hour and then concentrated under vacuum. The oily residue is dissolved in 200 milliliters of ether and washed with two 100-milliliter portions of aqueous sodium bicarbonate. After drying with magnesium sulfate, the ether solution is distilled to afford 1-($\beta$-acetoxyethyl)-2,4-dinitropyrrole as a pale yellow, viscous oil of boiling point 135–140° C. at 0.003 mm. The yield is 4.5 grams (67.2%).

Calcd. for $C_8H_9O_6N_3$: C, 39.51; H, 3.7. Found: C, 39.24; H, 3.73.

EXAMPLE VII

1-Carboxymethyl-2,4-Dinitropyrrole

To a cold (5° C.) solution of 5.2 grams (0.0214 mole) of 1-carbethoxymethyl-2,4-dinitropyrrole (prepared according to the process of Example II, from ethyl chloroacetate) in 150 milliliters of methanol is added 0.855 gram (0.0214 mole) of sodium hydroxide in 10 milliliters of water. To the resulting paste is added 200 milliliters of water and this mixture is warmed at 45° C. for 10 minutes. After it has been cooled to 0° C., this solution is acidified with hydrochloric acid and the precipitated carboxylic acid is filtered off, washed on the filter with cold water, and dried in air. The 1-carboxymethyl-2,4-dinitropyrrole thus isolated, in almost quantitative yield, is hydrated. It melts at 205–207° C., after slow loss of water of hydration on the melting point stage.

Calcd. for $C_6H_5O_6N_3$: C, 33.50; H, 2.34. Found: C, 33.63; H, 2.60.

EXAMPLE VIII

1-(N,N-Diethyl)Carbamylmethyl-2,4-Dinitropyrrole

A mixture of 4.3 grams (0.0198 mole) of 1-carboxymethyl-2,4-dinitropyrrole hydrate (prepared as described in Example VII) and 30 milliliters of thionyl chloride is boiled under reflux for 2½ hours and then concentrated under vacuum at 60° C. The dark oily residue is dissolved in 20 milliliters of toluene and reconcentrated under vacuum at 60° C. The residue is then leached with 100 milliliters of dry ether and the ether solution is decanted from a little tarry matter into a vigorously stirred solution 3 milliliters of diethylamine in 70 milliliters of dry ether. After 2 hours of stirring at 25° C., 50 milliliters of water, 5 grams of sodium bicarbonate, and 100 milliliters of chloroform are added. The mixture is shaken vigorously and the layers are separated. After drying with magnesium sulfate, the ether solution is concentrated under vacuum. The residual dark solid is boiled briefly in 900 milliliters of water and the mixture is filtered while hot, after addition of 5 grams of Supercel. Supercel is a diatomaceous silica filter aid manufactured by Johns-Manville. Slow chilling of the filtrate to 0° C., affords 1-(N,N-diethyl)-carbamylmethyl-2,4-dinitropyrrole as small buff flakes of melting point 102–103° C. The yield is 2.4 grams (51.9%).

Calcd. for $C_{10}H_{14}O_5N_4$: N, 20.73. Found: N, 20.82.

EXAMPLE IX

1-(N-Butyl)Carbamylmethyl-2,4-Dinitropyrrole

This compound is prepared as described in Example VIII, using dry N-butylamine in place of diethylamine. The melting point is 133–134° C., after recrystallization from ethyl acetate, and the yield from an equal quantity of starting material is 2.3 grams (49.7%).

Calcd. for $C_{10}H_{14}O_5N_4$: N, 20.73. Found, N, 20.32.

EXAMPLE X

1-[N-(5-Nitro-2-Thiazolyl)]Carbamylmethyl-2,4-Dinitropyrrole

This compound is prepared as described in Example VIII, using 2-amino 5-nitrothiazole in place of diethylamine. The melting point is above 300° C., after recrystallization from acetone, and the yield, from an equal quantity of starting material is 1.75 grams (25.8%).

Calcd. for $C_9H_6O_7N_6S$: C, 31.57; H, 1.77. Found: C, 31.85; H, 2.03.

The experimental details and physical constants of other compounds of the present invention prepared according to the methods illustrated in Examples I through X above, appear in Tables I, II and III. The constants of compounds not listed in Table III may be found in the detailed Examples I through X.

TABLE I

1-Alkyl-2,4-Dinitropyrroles, From Dialkyl Sulfates

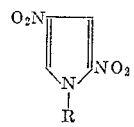

| R | Reaction Conditions (in Dimethylformamide) | Yield, Percent |
|---|---|---|
| $CH_3$ | 1 min. at 145° | 65 |
| $C_2H_5$ | 2 min. at 145° | 55 |
| n-$C_3H_7$ | 1 min. at 145° | 45 |
| n-$C_4H_9$ | 1 min. at 145° | 83 |

TABLE II

1-Alkyl-2,4-Dinitropyrroles, From Alkyl Halides

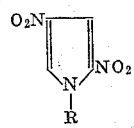

| R | Alkylating Agent | Reaction Conditions (in Dimethylformamide) | Yield, Percent |
|---|---|---|---|
| n-$C_3H_7$ | n-$C_3H_7Br$ | 3½ hrs. at 135° | 47 |
| iso-$C_3H_7$ | iso-$C_3H_7I$ | 1½ hrs. at 140° | 40 |
| iso-$C_4H_9$ | iso-$C_4H_9Br$ | 1 hr. at 145° | 64 |
| sec-$C_4H_9$ | sec-$C_4H_9Br$ | 1½ hrs. at 140° | 30 |
| iso-$C_5H_{11}$ | iso-$C_5H_{11}Br$ | ½ hr. at 140° | 74 |
| sec-$C_5H_{11}$ | sec-$C_5H_{11}Br$ | ¾ hr. at 140° | 28 |
| n-$C_6H_{13}$ | n-$C_6H_{13}Br$ | 2 hrs. at 130° | 74 |
| sec-$C_8H_{17}$ | sec-$C_8H_{17}Cl$ | ½ hr. at 140° | 24 |
| $CH_2C_6H_5$ | $C_6H_5CH_2Cl$ | 1 min. at 150° | 85 |
| $CH_2CH_2CH_2Br$ | $BrCH_2CH_2CH_2Br$ | 20 min. at 150° | 54 |
| $CH_2OCH_3$ | $CH_3OCH_2Cl$ | 5 min. at 100° | 47 |
| $CH_2CH=CH_2$ | $CH_2=CHCH_2Br$ | 10 min. at 140° | 77 |
| $CH_2C\equiv CH$ | $HC\equiv C-CH_2Br$ | 7 min. at 140° | 74 |
| $CH_2COCH_3$ | $CH_3COCH_2Cl$ | 5 min. at 140° | 78 |
| $CH_2CH_2N(C_2H_5)_2$ | $(C_2H_5)_2NCH_2CH_2Cl$ | 15 min. at 100° | 69 |
| $CH_2CH_2OH$ | $HOCH_2CH_2Cl$ | 15 min. at 145° | 63 |
| $CH_2CH_2CH_2OH$ | $HOCH_2CH_2CH_2Cl$ | 15 min. at 145° | 55 |
| $CH_2CH_2CH_2OCOCH_3$ | $CH_3CO_2CH_2CH_2CH_2Cl$ | 45 min. at 145° | 51 |
| $CH_2CHOHCH_2OH$ | $CH_2OHCHOHCH_2Cl$ | 50 min. at 145° | 39 |
| $CH_2CO_2CH_3$ | $ClCH_2CO_2CH_3$ | 15 min. at 130° | 58 |
| $CH_2CO_2C_2H_5$ | $ClCH_2CO_2C_2H_5$ | 5 min. at 140° | 78 |
| $\underset{\overset{\|}{CHCH_2CH_3}}{CO_2C_2H_5}$ | $CH_3CH_2CHBrCO_2C_2H_5$ | 10 min. at 145° | 71 |
| $CH_2CH_2CH_2CH_2Br$ | $BrCH_2CH_2CH_2CH_2Br$ | 10 min. at 145° | 66 |
| $\underset{\overset{\|}{CH_2C=CHCO_2C_2H_5}}{CH_3}$ | $\underset{\overset{\|}{BrCH_2C=CHCO_2C_2H_5}}{CH_3}$ | 15 min. at 145° | 21 |
| $CH_2CONH_2$ | $ClCH_2CONH_2$ | 10 min. at 145° | 59 |

TABLE III

Physical Constants of 1-Alkyl-2,4-Dinitropyrroles of Tables I and II

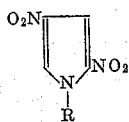

| R | B.P., °C./mm. | M.P., degrees | Analytical Calcd. | Analytical Found |
|---|---|---|---|---|
| $CH_3$ | 120–125/.2 | 96–97 | 35.09 C; 2.95 H | 35.40 C; 3.02 H |
| $C_2H_5$ | 105–110/.005 | 62–63 | 38.92 C; 3.81 H | 39.02 C; 3.68 H |
| n-$C_3H_7$ | 125–130/.2 | 56–57 | 42.21 C; 4.55 H | 42.26 C; 4.65 H |
| iso-$C_3H_7$ | 125–130/.7 | 119–120 | 42.21 C; 4.55 H | 42.43 C; 4.56 H |
| n-$C_4H_9$ | 130–135/.2 | | 45.07 C; 5.20 H | 45.02 C; 5.39 H |
| iso-$C_4H_9$ | 137–139/.4 | | 45.07 C; 5.20 H | 45.31 C; 5.18 H |
| sec-$C_4H_9$ | 125–130/.1 | 59–60 | 45.07 C; 5.20 H | 45.49 C; 5.27 H |
| iso-$C_5H_{11}$ | 135–140/.1 | | 47.57 C; 5.77 H | 47.65 C; 5.72 H |
| sec-$C_5H_{11}$ | 110–115/.005 | | 47.57 C; 5.77 H | 46.87 C; 5.75 H |
| n-$C_6H_{13}$ | 125–130/.002 | | 49.78 C; 6.27 H | 49.71 C; 6.15 H |
| sec-$C_8H_{17}$ | 150–155/.01 | | 53.52 C; 7.11 H | 53.13 C: 6.87 H |
| $CH_2C_6H_5$ | | 132–133 | 53.44 C; 3.67 H | 53.66 C; 3.81 H |
| $CH_2CH_2CH_2Br$ | 165–170/.01 | 67–68 | 30.43 C; 2.90 H | 30.23 C; 3.20 H |
| $CH_2OCH_3$ | | 67–68 | 35.83 C; 3.51 H | 36.03 C; 3.52 H |
| $CH_2CH=CH_2$ | | 68–69 | 42.64 C; 3.58 H | 42.94 C; 3.65 H |
| $CH_2C\equiv CH$ | | 78–79 | 43.08 C; 2.58 H | 43.69 C; 2.64 H |
| $CH_2CH_2CH_2CH_2Br$ | 180–185/.003 | 67–69 | 32.88 C; 3.45 H | 33.28 C; 3.62 H |
| $CH_2COCH_3$ | | 151–152 | 39.44 C; 3.31 H | 39.88 C; 3.35 H |
| $CH_2CH_2N(C_2H_5)_2$ | 140–145/.002 | | 46.87 C; 6.29 H | 47.18 C; 6.46 H |
| $CH_2CH_2OH$ | 150–155/.002 | 52–54 | 35.83 C; 3.51 H | 35.67 C; 3.60 H |
| $CH_2CH_2CH_2OH$ | 165–170/.005 | | 19.53 N | 19.47 N |
| $CH_2CH_2CH_2CH_2OCOCH_3$ | 170–175/.005 | | 44.28 C; 4.83 H | 44.50 C; 4.86 H |
| $CH_2CHOHCH_2OH$ | 200–210/.02 | 111–112 | 36.37 C; 3.92 H | 36.16 C; 3.93 H |
| $CH_2CO_2CH_3$ | | 141–142 | 36.69 C; 3.08 H | 36.67 C; 3.08 H |
| $CH_2CO_2C_2H_5$ | 140–145/.003 | 83–84 | 39.51 C; 3.73 H | 39.40 C; 3.65 H |
| $\underset{\overset{\|}{CHCH_2CH_3}}{CO_2C_2H_5}$ | 145–150/.002 | 71–73 | 44.28C; 4.83 H | 44.37 C; 4.90 H |
| $\underset{\overset{\|}{CH_2C=CHCO_2C_2H_5}}{CH_3}$ | 170–180/.005 | | 14.84 N | 14.57 N |
| $CH_2CONH_2$ | | 231–232 | 33.65 C; 2.82 H | 33.81 C; 2.87 H |

The in vitro trichomonadicidal activity of the compounds of the present invention may be demonstrated by a series of tests which establishes the minimal inhibitory concentration of these compounds. Minimal inhibitory concentration, as used above, is defined as the minimal concentration of a trichomonadicidal compound capable of preventing the growth of and killing *Trichomonas foetus* organisms introduced into a culture medium, capable alone of supporting a vigorous growth of the organisms and containing the trichomonadicidal compound to be tested. The culture medium used in the tests is described in a publication of Kupferberg, Johnson and Sprince, Proceedings of the Society for Experimental Biology and Medicine, volume 67, pages 304–308, 1948.

these tests appear in column 1 of Table IV, wherein the concentration of the 1-substituted-2,4-dinitropyrroles is expressed in parts per million.

The toxicity of the compounds of the present invention are determined by oral administration to mice and may be determined from the in vivo data appearing in Table IV. In colum 2, under the heading $LD_{50}$, is indicated the quantity (in milligrams per kilogram of body weight) which is fatal to 50% of the mice tested. The amount (in milligrams per kilogram of body weight) required to cure 50% of the test animals injected with a lethal does of *Trichomonas foetus* is indicatedi n column 3, under the heading $PD_{50}$. Column 4 of Table IV reports the therapeutic index of these compounds.

TABLE IV

*Trichomonadicidal Activity of 1-Substituted-2,4-Dinitropyrroles*

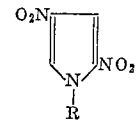

| R | In Vitro Activity, p.p.m. | In Vivo | | |
|---|---|---|---|---|
| | | $LD_{50}$ | $PD_{50}$ | T.I. |
| $CH_3$ | 0.4 | 220 | 67 | 3.3 |
| $C_2H_5$ | | 68 | | |
| $n$-$C_3H_7$ | | 900 | 30 | 30.0 |
| $iso$-$C_3H_7$ | 2.0 | 400 | 170 | 2.3 |
| $n$-$C_4H_9$ | 100.0 | 1,200 | 53 | 23.0 |
| $iso$-$C_4H_9$ | 10.0 | 1,000 | <84 | >12.0 |
| $sec$-$C_4H_9$ | 10.0 | 1,200–1,250 | 45 | 33.0 |
| $iso$-$C_5H_{11}$ | | 1,100 | 5.3 | 200.0 |
| $sec$-$C_5H_{11}$ | 20.0 | | | |
| $n$-$C_6H_{13}$ | 10.0 | >2,150 | 140–150 | >14.3 |
| $sec$-$C_8H_{17}$ | 10.0 | >2,150 | 400 | >5.0 |
| $CH_2C_6H_5$ | 6.6 | >535 | 335 | >1.6 |
| $CH_2CH_2CH_2Br$ | 10.0 | 1,400 | 120 | 12.0 |
| $CH_2OCH_3$ | 10.0 | 170 | | |
| $CH_2CH=CH_2$ | 20.0 | 75 | 59.5 | 1.2 |
| $CH_2C\equiv CH$ | 10.0 | 42 | 30 | 1.3 |
| $CH_2COCH_3$ | 10.0 | 1,000 | 37.5 | 27.0 |
| $CH_2CH_2N(C_2H_5)_2$ | 100.0 | >535 | | |
| $CH_2CH_2OH$ | 2.0 | 535 | 150 | 3.5 |
| $CH_2CH_2CH_2OH$ | 0.2 | 300 | | |
| $CH_2CH_2CH_2CH_2OH$ | 0.2 | >535 | | |
| $CH_2CH_2CH_2CH_2Br$ | 0.4 | | | |
| $CH_2CH_2OCOCH_3$ | 1.0 | >535 | | |
| $CH_2CH_2CH_2CH_2OCOCH_3$ | 1.0 | >535 | | |
| $CH_2CHOHCH_2OH$ | 2.0 | 1,050 | 15–20 | 52.0 |
| $CH_2CO_2H$ | 100.0 | >535 | | |
| $CH_2CO_2CH_3$ | 2.0 | >535 | | |
| $CH_2CO_2C_2H_5$ | 100.0 | >535 | | |
| $\underset{\overset{\|}{CHCO_2C_2H_5}}{CH_2CH_3}$ | 100.0 | >535 | | |
| $\underset{CH_2C=CH-CO_2C_2H_5}{\overset{CH_3}{\|}}$ | 4.0 | >535 | | |
| $CH_2CONH_2$ | 10.0 | 535–850 | 20 | 35.0 |
| $CH_2CONHC_4H_9$ | 1.0 | 4,000–5,000 | 50 | 100.0 |
| $CH_2CON(C_2H_5)_2$ | 1.0 | 1,400 | 10 | 140.0 |
| $CH_2CONH\!\!\begin{array}{c}\text{N}\\ \|\\ \text{S}\end{array}\!\!NO_2$ | 2.0 | >535 | | |

In making the tests to determine minimal inhibitory concentrations, 0.05 milliliter of a 48-hour culture of *Trichomonas foetus* is placed in a series of tubes containing 10 milliliters of the culture medium and increasing amounts of the compound to be tested. The inoculated culture medium is then incubated at 37° C. for nine days and examined under magnification after two, five, seven, and nine days. The minimal inhibitory concentration of the compound tested is that concentration in the tube in which no viable organisms are present at the ninth day examination. If there are no viable organisms present on examination at a time less than nine days, the concentration of compound is greater than minimal and if there are viable organisms present at the ninth day examination, the concentration is less than minimal. The results of In employing the trichomonadicides of the present invention for the treatment of *Trichomonas foetus*, one or more of the active agents are uniformly distributed in a suitable chemotherapeutic vehicle that is chemically compatible with the particular trichomonadicide selected, non-inhibiting with respect to the action of the effective agent upon *Trichomonas foetus* and essentially non-injurious to the vaginal mucosa under the conditions of use. The vehicle is preferably of a liquid or semi-liquid type. Furthermore, since the final preparation should be readily miscible with vaginal fluids, the vehicles, whether hydrous or anhydrous, are preferably water-miscible or water-dispersible. The compositions of this invention may be in the form of suppositories, if desired.

The foregoing criteria for a vehicle in which the compounds of the present invention are incorporated may be met by a large number of semi-liquid chemotherapeutic vehicles that are well known in the art. Thus, for example, the vehicle may comprise semi-liquids that are colloidal in nature, especially those that are viscous and/or mucilaginous in character. Such vehicles are particularly suitable for use in topical treatment of *Trichomonas foetus* because of their inherent gelatinous and miscible nature which affords prolonged contact between the 1-substituted-2,4-dinitropyrrole and the infecting organism.

In order to disclose more clearly the manner of formulating the compounds of the present invention to topical application, several specific examples will hereinafter be described in considerable detail.

EXAMPLE XI

| | |
|---|---|
| Deionized water | 75.80 |
| Sodium carboxymethylcellulose | 3.00 |
| Polyethyleneglycol (molecular weight approximately 4000) | 15.00 |
| Propylene glycol | 5.00 |
| Para-hydroxy-benzoic acid methyl ester | 0.20 |
| 1-methyl-2,4-dinitropyrrole | 1.00 |

EXAMPLE XII

| | |
|---|---|
| Deionized water | 90.30 |
| Methyl cellulose | 3.50 |
| Glycerin | 5.00 |
| Para-hydroxy-benzoic acid methyl ester | 0.20 |
| 1-(γ-hydroxypropyl)-2,4-dinitropyrrole | 1.00 |

EXAMPLE XIII

| | |
|---|---|
| Deionized water | 80.80 |
| Pectin | 8.00 |
| Propylene glycol | 10.00 |
| Para-hydroxy-benzoic acid methyl ester | 0.10 |
| Para-hydroxy-benzoic acid propyl ester | 0.10 |
| 1-(δ-hydroxybutyl)-2,4,-dinitropyrrole | 1.00 |

The trichomonadicidal formulations of Examples XI through XIII are prepared according to the following general procedure in which two initial solutions are mixed to make the formulation, all the parts being given by weight. To prepare Solution A, dissolve the para-hydroxy-benzoic acid methyl ester in about two-thirds of the hot deionized water, cool to about 170° F., and, while stirring, add the gel-forming ingredient and glycerine or propylene glycol. To prepare Solution B, add the trichomonadicidal agent to the remainder of the deionized water, and adjust the pH to the desired value. The formulation is prepared by adding Solution B to Solution A in a slow stream with good stirring; stirring is continued for at least one hour.

Certain compounds of the present invention have also been found to be effective against enterohepatitis (blackhead) when administered by admixture, suspension, or dispersion in the food and/or drink normally partaken by turkeys, such as grain, mash, scratch, water or other liquids.

The general range of concentration of the 1-substituted-2,4-dinitropyrrole in the total substance is from about 0.05% or less to about 1%. The optimal concentration for effective therapy is in the range from about 0.05% to about 0.2% of the total food or drinking water. With these optimal concentrations, the daily drug intake for infected birds varies from about 20 milligrams of drug per kilogram of body weight to about 400 milligrams of drug per kilogram of body weight. In general, the precise dosage depends on the particular compound and the severity of the infection. Many of the compounds of the present invention may be administered in the concentrations indicated above with little or no toxic effects.

Various changes and modifications of the invention may be made and to the extent that such variations incorporate the spirit of this invention, they are intended to be included within the scope of the appended claim.

This application is a division of my co-pending application, Serial No. 23,383, filed on April 20, 1960, now abandoned.

What is claimed is:

A compound having the formula

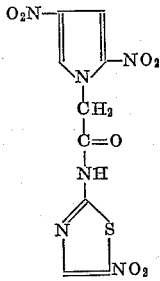

References Cited in the file of this patent

UNITED STATES PATENTS

| | | |
|---|---|---|
| 2,735,798 | Kupferberg et al. | Feb. 21, 1956 |
| 2,780,630 | Kauer | Feb. 5, 1957 |
| 2,780,631 | Kauer | Feb. 5, 1957 |
| 2,838,521 | Lunsford | June 10, 1958 |
| 3,004,987 | Paris et al. | Oct. 17, 1961 |

OTHER REFERENCES

Chemical Abstracts Subject Index, vol. 41, pages 5963 (1945).

UNITED STATES PATENT OFFICE
CERTIFICATE OF CORRECTION

Patent No. 3,156,699                      November 10, 1964

George Karmas

It is hereby certified that error appears in the above numbered patent requiring correction and that the said Letters Patent should read as corrected below.

Column 3, line 54, for "H, 3.7" read -- H, 3.73 --; column 8, line 11, for "does" read -- dose --; line 12, for "indicatedi n" read -- indicated in --.

Signed and sealed this 6th day of April 1965.

(SEAL)
Attest:

ERNEST W. SWIDER                       EDWARD J. BRENNER
Attesting Officer                        Commissioner of Patents